Patented Aug. 20, 1940

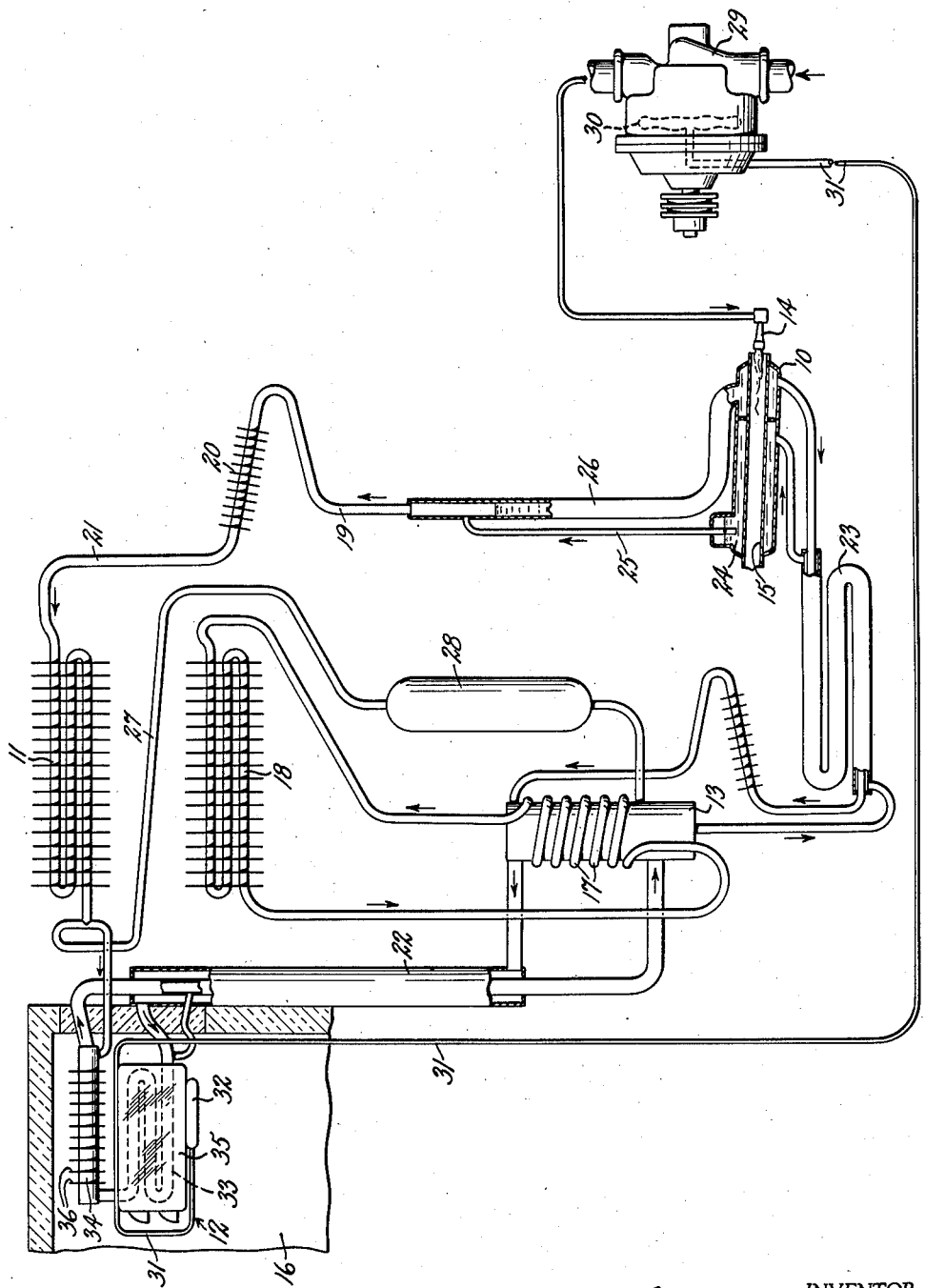

2,212,277

UNITED STATES PATENT OFFICE 2,212,277

REFRIGERATION

Harry C. Shagaloff, Evansville, Ind., assignor to Servel, Inc., New York, N. Y., a corporaton of Delaware Application December 8, 1936, Serial No. 114,725

4 Claims. (Cl. 62—5)

My invention relates to refrigeration and it is an object of the invention to provide an improvement in thermostatic control of refrigeration apparatus having a plural temperature evaporator or cooling element as will appear from the following description and accompanying drawing in which the figure shows a refrigeration system embodying the invention.

The refrigeration system shown in the drawing is generally like that described in U. S. Patent No. 1,609,334 to von Platen and Munters. It is made up of a number of steel vessels and pipes welded together to form an hermetically sealed system. All the spaces of the system are in open and unrestricted communication so that all parts are at the same total pressure. The system contains hydrogen and a water solution of ammonia or other suitable fluids.

The parts of the system include a generator 10, a condenser 11, an evaporator 12 and an absorber 13. The generator 10 is heated by a gas burner 14 arranged so that the burner flame is projected into a generator heating flue 15. The evaporator 12 is located in a thermally insulated storage compartment 16. The condenser 11 is provided with heat radiation fins for cooling by air. The absorber 13 is cooled by a vaporization-condensation circuit comprising a cooling coil 17 arranged in thermal exchange relation with the absorber connected to a condenser 18, this circuit containing a suitable volatile heat transfer fluid such as methyl chloride.

Ammonia vapor expelled from solution by heat in the generator 10 flows through a conduit 19, a rectifier 20, and conduit 21 into the condenser 11 where the ammonia vapor is condensed to liquid. The liquid ammonia flows from the lower end of the condenser 11 into the upper part of the evaporator 12.

Hydrogen circulates through the evaporator 12 and the absorber 13 by way of a gas heat exchanger 22. In the evaporator, the liquid ammonia evaporates and diffuses into the hydrogen, producing a refrigeration effect. In the absorber 13, ammonia vapor is absorbed out of the rich gas by weakened absorption solution. The absorption solution is circulated through and between the generator 10 and the absorber 13 by way of a liquid heat exchanger 23, and circulation of the solution is caused by the lifting action of vapor formed in chamber 24 of the generator which raises liquid through a riser 25 into the generator standpipe 26 where the liquid level is such that solution overflows therefrom into the absorber.

A vent conduit 27 is connected from the outlet end of the condenser 11 to the absorber 13 and is provided with a hydrogen reserve vessel or pressure vessel 28. The gas burner 14 is controlled by a valve 29 operated by a thermostat comprising an expansible diaphragm 30 connected by a capillary tube 31 to a bulb 32 which is placed in contact with the bottom of the evaporator 12.

The evaporator 12 is shown more or less diagrammatically as a pipe coil having a lower portion 33 and an upper portion 34. The lower portion 33 of the evaporator coil is imbedded in an aluminum casting 35 providing a freezing compartment having shelves for receiving ice freezing trays or the like. The surface of the casting is relatively smooth and presents only a limited surface for heat transfer thereto from air in the refrigerator compartment. The upper end of the evaporator coil is provided with fins 36 providing a relatively extensive surface for cooling air in the refrigerator storage compartment.

Liquid ammonia which enters the upper end of the evaporator coil flows downward in the coil and gas circulating between the evaporator and the absorber flows upwardly through the evaporator coil. The gas in the upper part of the evaporator coil contains a greater amount of ammonia vapor than gas in the lower part of the coil. The partial pressure of ammonia vapor in the gas in the evaporator coil is a gradient so that the evaporating temperature of liquid ammonia in the coil is also a gradient, being higher in the upper or air cooling portion of the evaporator.

The thermostat operating the burner control valve is operable to maintain the valve closed for an abnormal period to permit melting of frost on the evaporator 12, the abnormal period being terminated upon a predetermined abnormal expansion of the thermostat diaphragm 30. This thermostatic control device is fully described and explained in an application Serial No. 758,195 of Sven W. E. Andersson, filed December 19, 1934, which is now Patent No. 2,123,921, granted July 19, 1938, and is shown here only for the purpose of explaining one advantage of the present invention.

The expansible diaphragm operates responsive to the temperature of the bulb on the bottom of the evaporator. In defrosting, the bottom of the evaporator 12 may have reached a temperature of, say, 40° F. before ice has melted from the upper part of the evaporator where the temperature has not yet reached 40° F. In other words, it is desirable that the thermostat operate responsive to the coldest part of the plural temperature evaporator and the coldest part may vary under different conditions of operation. I therefore place a portion of the capillary tube 31 in contact with an upper or intermediate portion of the evaporator 12. In the drawing this contact of the capillary tube is shown at the top of the aluminum casting. It could also be made on the top or box cooling portion of the evaporator. The length of capillary tube held in contact with the evaporator must have sufficient volume to contain the liquid in the thermostat fluid system under operating conditions. With this arrangement, control of the thermostatic operation of the burner valve is shifted to that portion of the capillary tube in contact with the evaporator when the point of contact is at a lower temperature than the bulb.

The invention could be similarly carried out by providing a plurality of branches of the thermostat fluid circuit or providing a number of temperature responsive devices arranged so that control would be responsive only to evaporator temperature at the point of lowest temperature.

What is claimed is:

1. Refrigeration apparatus including a generator, a condenser, an absorber, an evaporator, a heater for the generator, a device for controlling the heater, and an expansible fluid thermostat for operating said control device and arranged in contact with said evaporator at a plurality of places, the part of said thermostat at each of said places of contact having sufficient volume to contain all the liquid expansible fluid under operating conditions.

2. An absorption refrigeration system including an evaporator constructed and arranged for flow of inert gas therethrough and downward flow of liquid in the presence of the gas, members including a generator and condenser for supplying liquid refrigerant to the upper part of said evaporator, a heater for said generator, a device for controlling said heater, and an expansible fluid thermostat for operating said control device and arranged in contact with said evaporator at a plurality of points at different elevations, the part of said thermostat at each of said points of contact having sufficient volume to contain all the liquid expansible fluid under operating conditions.

3. Refrigeration apparatus including a cooling element, a device for controlling operation of said apparatus, and thermostatic means for operating said device arranged so as to be subjected to different temperature conditions which may be variously higher and lower than each other at a plurality of places affected by said cooling element, and constructed to respond only to change in the lowest of said temperature conditions.

4. Apparatus as set forth in claim 3 in which said thermostatic means is an expansible fluid thermostat in thermal contact with said cooling element at each of said plurality of places, the part of said thermostat at each of said places having sufficient volume to contain all the liquid expansible fluid under operating conditions.

HARRY C. SHAGALOFF.